Patented Apr. 26, 1949

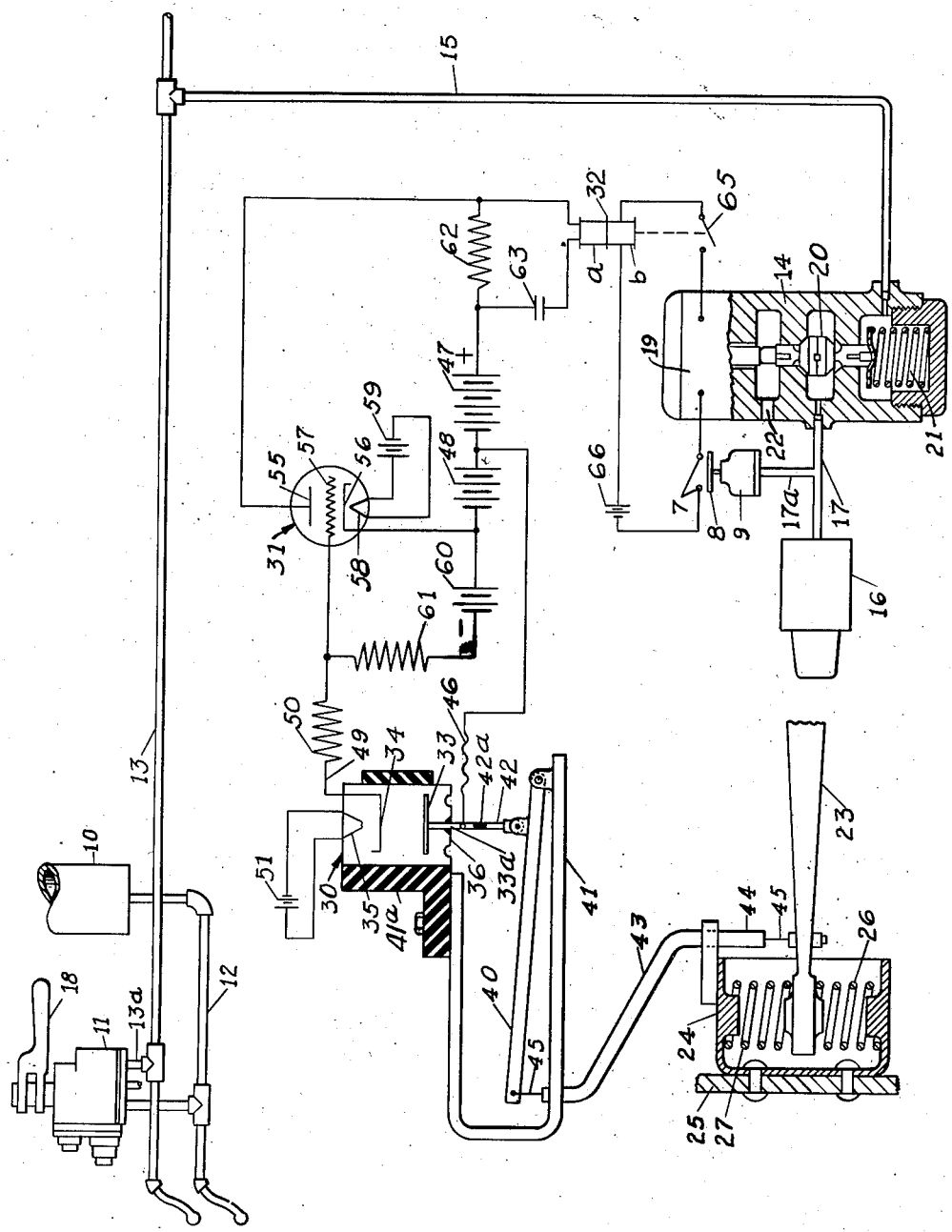

2,468,199

UNITED STATES PATENT OFFICE 2,468,199

ELECTRONIC WHEEL SLIP DETECTOR

Claude M. Hines, Verona, Pa., assignor to The Westinghouse Air Brake Company, Wilmerding, Pa., a corporation of Pennsylvania Application March 30, 1945, Serial No. 585,678

11 Claims. (Cl. 188—181)

This invention relates to brake control means for vehicles such as railway cars and trains, and relates more particularly to an apparatus responsive to a slipping condition of a vehicle wheel for automatically effecting rapid reduction in the brake force associated with the slipping wheel for causing the wheel to return to vehicle speed without reducing in speed to a locker or sliding condition.

In this application the term "slipping condition" as applied to a vehicle wheel designates a rotation of the wheel at a speed other than a speed corresponding to the vehicle speed at a given instant.

The term "sliding condition" as used herein designates the dragging of a vehicle wheel along the road or rail surface in a locked or non-rotative position. A sliding wheel develops flat spots on the tread surface which, in the case of a railway car wheel, necessitates returning or replacement of the wheel, an undesirable item of maintenance expense to the railroads. The two terms "sliding" and "slipping" are therefore not synonymous.

It has been demonstrated that if the brakes associated with a slipping wheel are promptly and quickly released at the incipiency of the slipping condition, the wheel will be restored to a rotative speed corresponding to the vehicle speed without decelerating to the locked or sliding condition. Various types of devices have been proposed, and in some cases employed, for detecting the slipping condition of a vehicle wheel and automatically controlling the braking force applied to the wheel for the purpose just described. One such type of device utilizes the sudden reduction of the torque force exerted on the brake elements, such as the brake shoes applied to the tread of a railway car wheel, when the wheel is caused to slip by reason of excessive braking forces applied to the wheel, as a means of detecting the slipping condition.

In my present invention, I propose to utilize this principle of variation of torque force on the brake elements associated with a vehicle wheel in an improved arrangement for detecting and correcting wheel slip in its incipient stages so as to prevent sliding of the wheels.

It is an object of my invention, therefore, to provide a brake control apparatus including electronic means for recognizing or detecting a slipping condition of a vehicle wheel and effective to initiate a rapid release of the brakes associated with the wheel, in response to the sudden reduction in torque exerted on the brake elements incidental to the slipping condition.

Another object of my invention is to provide a brake control apparatus of the type indicated in the foregoing object and further characterized by a movable anode electron discharge device translating variations in the torque exerted on the brake elements into a corresponding electrical characteristic.

The above objects and other objects of my invention, which will be made apparent hereinafter, are attained by means of apparatus subsequently to be described and shown in the accompanying drawing, the single figure of which illustrates a simplified brake control equipment embodying my invention.

Referring to the accompanying drawing, a simplified fluid pressure brake control apparatus of the familiar straight-air type is illustratively shown for applying braking force to a vehicle wheel (not shown). The straight-air brake system includes a supply reservoir 10, a self-lapping type of brake valve 11 connected to the reservoir 10 by a pipe 12, a straight-air or control pipe 13 connected to the brake valve 11 by a branch pipe 13a, a magnet valve device 14 connected to the straight-air pipe 13 by a branch pipe 15, a brake cylinder 16 connected to the magnet valve device 14 by a pipe 17 and a pneumatic switch device 9 connected to pipe 17 and responsive to fluid under pressure therein. The supply reservoir 10 is maintained charged to a predetermined pressure by an air compressor (not shown).

The self-lapping brake valve 11 may be of the type disclosed in Patent 2,042,112 to Ewing K. Lynn Jr. and Rankin J. Bush. Briefly, it comprises a self-lapping valve mechanism including a supply valve, an exhaust valve and a rotary operating shaft to which a handle 18 is secured. The self-lapping valve mechanism is arranged to supply fluid under pressure from the supply reservoir 10 to the straight-air pipe 13 when the operating handle 18 of the brake valve 11 is operated out of its normal release position into the brake application zone. The brake valve is operative to release fluid under pressure from the straight-air pipe to the atmosphere when the operating handle 18 is returned toward release position. The pressure established in the straight-air pipe will vary correspondingly with the degree of displacement of the brake valve handle out of its release position. This self-lapping type of brake valve has a pressure-maintaining characteristic for maintaining the pressure in the straight-air pipe at a value that corresponds to the handle position notwithstanding a tendency for the pressure in the straight-air pipe to reduce for any reason, such as leakage or from reapplication of the brakes after a wheel-slip condition has been corrected.

The straight-air pipe 13 extends the full length of the car or, in the case of a train of cars, extends the full length of the train, with the conventional hose couplings between the cars connecting the sections of straight-air pipe on successive cars.

The magnet valve device 14 may be of standard construction and comprises essentially a magnet winding 19 and a double seated valve 20. The valve 20 is normally biased into seated relation on its upper seat, as shown, by a spring 21 and is moved from the upper seat into engagement with the lower seat when the magnet winding 19 is energized in the manner hereinafter explained. With the magnet winding normally deenergized, the valve 20 establishes communication from the branch pipe 15 and the straight-air pipe 13 to the pipe 17 leading to the brake cylinder 16. When the magnet winding 19 is energized upon the occurrence of a wheel slip condition as hereinafter described, the supply of fluid under pressure from the pipe 15 to the brake cylinder 16 is cut off and an exhaust communication is established between the brake cylinder pipe 17 and an atmospheric port 22, through which fluid under pressure in the brake cylinder is rapidly vented. Braking forces active on the vehicle wheel are thereupon quickly reduced to permit the wheel to promptly return to the normal rotational condition.

The brake cylinder 16 is operative upon the supply of fluid under pressure thereto under the control of the brake valve 11 through the straight air pipe 13, the branch pipe 15, the magnet valve device 14 and pipe 17 to apply braking force to the vehicle wheel through the medium of suitable brake rigging or levers and brake shoes (not shown).

The fluid pressure operated switch device 9, hereinafter called "pressure switch 9" may be of any present standard pressure operated switch construction. It is connected by a short fluid pressure conductor 17a to the brake cylinder pipe 17 in a manner to be operatively responsive to variations of fluid under pressure in the brake cylinder 16. As diagrammatically shown, the pressure switch 9 comprises a contact 8 that cooperates with a pair of stationary insulated contacts 7. Contact 8 is normally urged out of engagement with contacts 7 and is actuated into engagement with the contacts 7 whenever and so long as the fluid pressure supplied to the pressure switch exceeds a certain pressure such as, for example, five pounds per square inch. When the fluid pressure supplied to the pressure switch reduces below the critical pressure of five pounds, the movable contact 8 is shifted back to its normal open position out of engagement with contacts 7.

The brake shoes may be connected in any suitable manner through the brake rigging or levers to a so-called "torque arm" 23. Patent 2,226,557 to Eksergian described a torque arm of this type. The free end of the torque arm 23 is resiliently supported in a normal centered or non-torque position in a channel section casing 23 secured to a fixed member 25 of the vehicle truck, by two springs 26 and 27 contained in the casing. Whenever the brake shoes are applied to the vehicle wheel or other brake element rotatable with the wheel, to exert a braking force on the wheel, the dragging effect on the shoes is effective to shift the free end of the torque arm out of its centered position in accordance with the degree of braking torque exerted on the wheel.

According to my invention, I further provide electrical apparatus including an electron discharge tube 30 of the well-known movable anode type, an amplifier tube 31 of the vacuum triode type, a polarized relay 32 and suitable resistors and electrical current sources hereinafter identified.

The movable anode tube 30 is of the vacuum diode type comprising a tubular metallic envelope containing a movable anode 33, a cathode 34 and a cathode heating element 35. A flexible metallic diaphragm 36 is suitably attached in sealed relation to an open end of the metallic envelope. The movable anode 33 is supported in insulated relation on the diaphragm 36 as by a stem 42. The diaphragm 36 of the tube 30 is coupled to the torque arm 23 by a suitable motion-reducing mechanism. This mechanism is so constructed and arranged that the diaphragm 36 and the movable anode 33 will be moved a proportionately smaller amount for a given movement of the torque arm 23 and at the same time be positioned in accordance with the position of the torque arm 23. This motion-reducing mechanism as illustratively shown, may include a lever 40 that is pivotally mounted at one end on a supporting member 41 on which the tube 30 is also supported in a bracket 41a of insulating material. The lever 40 is arranged to move the diaphragm and the anode 33 by means of a hinged connection thereof with the outer end of stem 42. The free end of lever 40 is connected by means of a Bowden cable 43 to the torque arm 23. The outer sheath portion 44 of the Bowden cable is anchored at one end adjacent the torque arm 23 as by a bracket attached to the casing 24 and at the other end to the supporting member 41. The longitudinally movable wire 45 of the Bowden cable is secured at one end to the torque arm 23 and at the other end of lever 40 so that the free end of lever 40 will move directly in accordance with the movement of the torque arm 23.

The stem 42 includes an insulation portion 42a whereby the portion 33a of the stem between the diaphragm and the insulating portion 42a may constitute an external terminal for anode 33. The external terminal of anode 33 is connected by a conductor 46, including a flexible portion, to the negative terminal of a battery 47 and to the positive terminal of a battery 48. The terminal of cathode 34 is connected by a conductor 49 including therein a resistor 50 to the control grid 57 of the amplifier tube 31. The cathode heating filament 35 of tube 30 is energized by a current from a suitable source, such as a battery 51.

The amplifier tube 31 is a vacuum type triode tube including an anode 55, a cathode 56, a control grid 57 and a cathode heating filament 58. The cathode heating filament 58 is energized by a current from a suitable source such as a battery 59. The cathode 56 is connected to the negative terminal of the supply battery 48 and to the positive terminal of a grid bias battery 60. The negative terminal of the bias battery 60 is connected by a biasing resistor 61 to the terminal of the control grid 57. The terminal of anode 55 is connected to one end of a resistor 62, the other end of which is connected to the positive terminal of the supply battery 47.

The relay 32 includes a single front contact 65 and two windings respectively identified by the reference letters $a$ and $b$. The winding $a$ is a pick-up winding effective when energized by current flow in only one certain direction, as will be explained more fully hereinafter, to cause pick-up of the contact 65, that is actuation thereof from its normally dropped-out or open position to its closed position. Winding $b$ of relay 32 is a "stick" or holding winding, effective when energized in response to pick-up of contact 65 as hereafter explained, to maintain the contact 65 picked-up.

The pick-up winding $a$ of relay 32 and a condenser 63 are connected in series relation across resistor 62. The arrangement is such that whenever the voltage drop across the resistor 62 increases, the flow of current through winding $a$ of relay 32 to charge condenser 63 is in a direction opposite to that required to cause pick-up of contact 65 of relay 32 and the contact is thus impelled to remain in its dropped-out position. On the other hand whenever the voltage drop across resistor 62 decreases, the flow of current discharge from condenser 63 locally through the winding $a$ of relay 32 and resistor 62 is in a direction tending to cause pick-up of relay 32. As will be more fully explained hereafter the relay 32 is not picked-up unless the current discharged from the condenser 63 through winding $a$ exceeds a certain value which is in turn proportional to the rate of reduction of voltage drop across resistor 62.

*Operation*

Let it be assumed that the vehicle is being propelled under power and that the brakes are released. In the absence of braking force, the torque arm 23 is retained in the central position, as shown, by the centering springs 26 and 27. The lever 40 which is coupled to the torque arm 23 by the Bowden cable 43 will position the movable anode 33 correspondingly in a position such that the minimum of current flows between the anode 33 and the cathode 34, in the circuit including batteries 48 and 60 and resistors 50 and 61. With such minimum current flowing through resistor 61, the negative biasing potential provided by battery 60 predominates over the opposing positive grid biasing voltage drop across resistor 61 and hence the control grid 57 is negatively biased so as to cause the tube 31 to have a minimum conductivity. A minimum of current flows, therefore, from the anode to the cathode of tube 31, with the result that the potential drop across resistor 62 is at a minimum due to minimum current flow in the circuit including the tube 31, the series connected batteries 47 and 48 and resistor 62. The winding $a$ of relay 32 will be energized by the charging current of condenser 63 but the direction of flow of this current is opposite to that required to cause pick-up of the relay contact 65 and contact 65 thus remains in its dropped-out or open position. The winding of magnet valve 14 is therefore deenergized and valve 20 will be on its upper seat in which the atmospheric passage is closed and communication is established between the branch pipe 15 and pipe 17 leading to the brake cylinder.

Let us now assume that with the vehicle in motion, propulsion power is cut off and a brake application made by moving the brake valve handle 18 into the application zone to a position corresponding to the degree of brake application desired. The control pipe 13 is accordingly charged with fluid under pressure from the supply reservoir 10 until the pressure established in the control pipe corresponds to the position of the brake valve handle in its application zone. Fluid under pressure in pipe 13 flows through the branch pipe 15 past valve 20 of the magnet valve 14 to pipe 17 to charge the brake cylinder and through pipe 17a to the pressure switch 9.

The pressure switch 9 is actuated to move the contact member 8 into bridging relationship with the stationary contacts 7. The brake cylinder is charged with fluid at a pressure equal to that in the control pipe.

The brake cylinder 16 is accordingly operative through the usual brake rigging to apply braking force to the vehicle wheel. A torque force will thus be exerted on the torque arm 23 causing the arm to be moved upwardly compressing spring 27. As the spring 27 is compressed, the movement of the torque arm 23 is transmitted by the Bowden cable to the lever 40 causing it to move upwardly and through stem 42, shift the diaphragm 36 and movable anode 33 of the movable anode tube 30 toward the cathode 34 an amount corresponding to the amount of displacement of the torque arm 23 out of its centered or no-torque position.

As is well known, the conductivity of a movable anode tube, such as the tube 30, varies inversely as the square of the distance between the anode 33 and the cathode 34. Thus due to the reduction of the distance between anode 33 and cathode 34 of tube 30, as just described, the current in the circuit including resistors 50 and 61 is correspondingly increased. The amount of potential drop across biasing resistor 61 thus increasingly reduces the negative potential of biasing battery 60 on control grid 57 of the amplifier tube 31. The current flow between the anode 55 and the cathode 56 of tube 31 will increase as the negative bias potential impressed upon the control grid 57 reduces. As the braking torque effective to displace torque arm 23 increases, the movable anode 33 is moved correspondingly closer to the cathode 34 and thus the negative bias on the control grid 57 of tube 31 reduces correspondingly, with a consequent increase in the flow of current through the circuit controlled by tube 31 and including resistor 62. With increasing current flow through resistor 62, the voltage drop thereacross correspondingly increases, thereby causing the condenser 63 to be charged to an increasing potential by flow of charging current through the winding $a$ of relay 32 without causing pick-up of the contact 65 of relay 32.

Let it now be supposed that a slipping condition of the wheel with which torque arm 23 is associated occurs as a result of excessive brake forces applied to the wheel. At the instant the wheel slip condition is initiated, a substantial and rapid reduction of braking torque exerted on the vehicle wheel occurs by reason of the change from static friction to kinetic friction between the wheel and the rail, it being well known that the kinetic friction is less than the static friction of the wheel on the rail. Such reduction in the braking torque exerted on the wheel results in the movement of the torque arm 23 back toward the neutral or no-torque position at an abnormally rapid rate under the influence of spring 27. This sudden and rapid movement of the torque arm 23 toward the neutral position results in corresponding movement of the lever 40 to cause the movable anode 33 of the tube 30 to be moved away from the cathode 34. Due to the rapid reduction in the conductivity of the anode-cathode path of tube 30, thus effected, the current flowing through tube 30 and its associated circuit including biasing resistor 61 is correspondingly rapidly reduced, with the result that the negative bias on the control grid 57 of tube 31 rapidly increases. With the increase in the negative potential bias on the control grid 57 of tube 31, a decrease in the current flowing in the circuit of tube 31 including resistor 62 occurs at a correspondingly rapid rate, thereby causing reduction of the voltage drop across resistor 62 at a correspondingly rapid rate.

This reduction of voltage drop across resistor 62 in turn causes a discharge flow of current from condenser 63 locally through winding $a$ of relay 32 and resistor 62 in the proper direction and amount to cause pick-up of the relay contact 65. With the relay contact 65 thus actuated to its picked-up or closed position, a circuit is closed for causing current from the positive terminal of battery 66 to flow through the lower winding $b$ of relay 32, contact 65, the winding of magnet valve 14 and the pressure switch contacts 7 and 8 back to the negative terminal of the battery. With winding $b$ of relay 32 thus energized, the contact 65 of the relay is maintained in its picked-up or closed position until the pressure switch 9 opens its contacts 7 and 8, as will be explained presently.

With the winding of magnet valve 14 energized, the valve 20 is moved to its lower seat, closing communication from the pipe 15 to the brake cylinder and opening the brake cylinder pipe 17 to the atmospheric port 22. Brake cylinder pressure and the actuating pressure in the pressure switch 9 is thus quickly vented to the atmosphere until the pressure in the switch operating chamber and in the brake cylinder is reduced to below the pressure required to maintain the switch contacts in closed position. The reduction in brake cylinder pressure will reduce the braking force acting on the vehicle wheel and will permit the vehicle wheel to return quickly to a rotative speed corresponding to vehicle speed before the wheel can decelerate to a locked condition and slide.

With the continued reduction of brake pressure, the braking torque further reduces, permitting the torque arm 23 to return further toward the middle or neutral position. This will permit the condenser 63 to continue to discharge through the winding $a$ of relay 32 and resistor 62 although the current may be insufficient to cause pick-up or to maintain the relay contact 65 picked-up. The relay 32 will, however, be maintained positively in its picked-up position, by reason of the energization of the holding winding $b$ until the contacts 7 and 8 of pressure switch 9 are separated in response to reducing brake cylinder pressure. Brake cylinder pressure is thus reduced by venting to atmosphere through the magnet valve 14 and the braking force is thereby reduced sufficiently to insure restoration of the wheel to vehicle speed.

When the brake cylinder pressure is reduced to below a predetermined low value, assumed to be five pounds per square inch, contacts 7 and 8 of the pressure switch 9 are separated, thus interrupting the flow of energizing current through the winding of magnet valve 14 and the holding winding $b$ of the relay 32. Upon such deenergization of the winding of magnet valve 14, the valve 20 is returned to its upper seat in which the venting of fluid under pressure from the brake cylinder is terminated or cut off and fluid under pressure from the pipe 15 and the straight air pipe 13 is resupplied to the brake cylinder.

When winding $b$ of relay 32 is thus deenergized, the contact 65 is restored to its dropped-out or open position because winding $a$ of relay 32 is now insufficiently energized to retain the relay contact in its picked-up position. Restoration of pressure in the brake cylinder and consequent reclosing of contacts 7 and 8 of pressure switch 9 will not effect energization of winding $b$ to cause pick-up of relay 32, by reason of the energizing circuit for winding $b$, being open at the dropped-out contact 65. Relay 32 accordingly remains dropped-out until again picked-up by energization of pick-up winding $a$ in response to a subsequent slip of the wheel.

With the vehicle finally brought to a stop in response to a brake application, the brakes will remain applied until released by the operator prior to again starting the vehicle. Ordinarily the torque arm 23 will remain displaced from its normal centered position at least a certain amount while the brakes are applied with the vehicle at a standstill. Should the torque arm return toward its neutral position at the instant the vehicle stops, such return movement of the torque arm will be at relatively slow rate. Thus, the rate of reduction of voltage-drop across resistor 62 at such time will be insufficient to cause pick-up of relay 32 and the consequent undesired release of the brakes.

It will thus be apparent that relay 32 will be operated to effect automatic reduction in the degree of application of the brakes only in response to actual occurrence of a wheel slip condition.

Having now described my invention, what I claim as new and desire to secure by Letters Patent, is:

1. In a vehicle brake control system of the type having brake means for applying a braking force to a vehicle wheel, in combination, brake control means operative during a brake application to effect a reduction in the degree of application of brakes, a member variously positioned in accordance with the degree of braking torque produced by the brake means, an electric circuit, electron discharge means controlled according to the position of said member and operative to establish an electrical characteristic in said circuit varying in degree according to the position of said member, and means responsive to a predetermined rate of change of said electrical characteristic occurring when the wheel slips due to brake application for effecting operation of the brake control means.

2. In a vehicle brake control system of the type having brake means for applying braking force to a wheel of the vehicle in combination, a member variously positioned in accordance with the degree of braking torque produced by the brake means, brake control means operative during a brake application to effect a reduction in the braking force exerted by the brake means, an electron discharge means having a fixed cathode and a movable anode, said movable anode being positioned and moved accordingly to the position and movement of said member and effective to vary the conductivity of the discharge means according to the position of said movable anode and correspondingly according to the position of said member, and means operatively responsive to a sudden change in conductivity of said discharge means occurring when the vehicle wheel slips due to a brake application, for effecting operation of the brake control means.

3. In a vehicle brake control system of the type having brake means for applying a braking force to a vehicle wheel, in combination, a member variously positioned in accordance with the degree of braking torque produced by the brake means, brake control means operative during a brake application to effect a reduction of the braking force exerted by the brake means, an electron discharge tube having a movable anode positioned and moved according to the position and movement of said member for correspondingly varying the conductivity of said discharge tube, an electric circuit, electronic amplifier means controlled in response to a sudden variation in the conductivity of said electron discharge tube, occurring when the wheel slips due to braking, for effecting variation of the current in said circuit at a corresponding rate, and means responsive to the variation of current in said circuit at a rate resulting when the wheel slips for effecting operation of said brake control means.

4. In a vehicle brake control system of the type having brake means for applying a braking force to a vehicle wheel, in combination, brake control means operative during a brake application to effect a reduction in the degree of application of the brakes, a member having a normal position and being displaced from said normal position during a brake application in accordance with the degree of braking torque produced by the brake means, electronic amplifier means having an anode-cathode path and a control element on which biasing potential is impressed effective, upon variation, to vary the conductivity of the anode-cathode path, a resistor, a source of direct current voltage, a circuit including the anode-cathode path of said electronic amplifier means, said resistor and said voltage source, means for varying the biasing potential impressed upon said control element in accordance with the degree of displacement of said member out of its normal position during a brake application, whereby to establish a corresponding voltage drop across said resistor and effect variation of said voltage drop at a rate corresponding to the rate of movement of said member, and means operatively responsive to a variation in the voltage drop across said resistor at a rate exceeding a certain rate, that occurs only when said member moves in response to the occurrence of a slipping condition of the wheel, for effecting operation of brake control means.

5. In a vehicle brake control system of the type having brake means for applying a braking force to a vehicle wheel, in combination, brake control means operative during a brake application to effect a reduction in the degree of application of the brakes, a member having a normal position and being displaced from said normal position during a brake application in accordance with the degree of braking torque produced by the brake means, electronic amplifier means having an anode-cathode path and a control element on which a biasing potential is impressed effective, upon variation, to vary the conductivity of the anode-cathode path, a resistor, a source of direct current voltage, a circuit including the anode-cathode path of said electronic amplifier means, said resistor and said voltage source, means for varying the biasing potential impressed on said control element in accordance with the degree of displacement of said member out of its normal position, whereby to vary the voltage drop across said resistor at a rate corresponding to the rate of movement of said member, a condenser charged according to the voltage drop across said resistor, and electroresponsive means operated in response to a current discharged from said condenser, when the voltage drop across said resistor reduces at a rate exceeding a certain rate, for effecting operation of the brake control means.

6. In a vehicle brake control system of the type having brake means for applying a braking force to a vehicle wheel, in combination, brake control means operative during a brake application to effect a reduction in the degree of application of the brakes, a member having a normal position and being displaced from said normal position during a brake application in accordance with the degree of braking torque produced by the brake means, electronic amplifier means having an anode-cathode path and a control element on which a biasing potential is impressed effective, upon variation, to vary the conductivity of the anode-cathode path, a resistor, a source of direct current voltage, a circuit including the anode-cathode path of said electron discharge means, said resistor and said voltage source, a biasing resistor connected to said control element, means for producing a voltage drop across said biasing resistor varying in degree substantially according to the degree of displacement of said member out of its normal position, said biasing resistor being effective to vary the biasing potential impressed upon the control element in such a manner as to vary the conductivity of the anode-cathode path of said electronic amplifier means and thereby the current in said circuit in accordance with the degree of displacement of said member out of its normal position, and means operative during a brake application following the establishment of a voltage drop across said resistor in response to the reduction of the voltage drop across said resistor at a rate exceeding a certain rate that occurs only when said member moves in response to the occurrence of a slip condition of the wheel for effecting operation of said brake control means.

7. In a vehicle brake control system of the type having brake means for applying a braking force to a vehicle wheel, in combination, brake control means operative during a brake application to effect a reduction in the degree of application of the brakes, a member having a normal position and being displaced from said normal position during a brake application in accordance with the degree of braking torque produced by the brake means, electronic amplifier means having an anode-cathode path and a control element on which a biasing potential is impressed effective, upon variation, to vary the conductivity of the anode-cathode path, a resistor, a source of direct current voltage, a circuit including the anode-cathode path of said electronic amplifier means, said resistor and said voltage source, a biasing resistor connected to said control element, an electron discharge device having a fixed cathode and an anode movable with respect to the cathode, for varying the degree of the conductivity of the anode-cathode path in said electron discharge device in accordance with the degree of separation of the movable anode from the cathode, a circuit including the anode-cathode path of said electron discharge device and said biasing resistor whereby the voltage drop across said biasing resistor varies with variation in conductivity of the anode-cathode path of said electron discharge device, the arrangement being such that the voltage drop across the said biasing resistor so controls the biasing potential impressed on said control element of said electronic amplifier means as to cause variation of the conductivity of the anode-cathode path of said electronic amplifier means substantially in accordance with the degree of displacement of said member out of its normal position and the consequent variation of the voltage drop across said resistor at a rate corresponding to the rate of movement of said member, a condenser charged according to the voltage drop across said resistor, electroresponsive means operated in response to a current discharged from said condenser when the voltage drop across said resistor reduces at a rate exceeding a certain rate for effecting operation of the brake control means.

8. In a vehicle brake control system of the type having brake means for applying a braking force to a vehicle wheel, in combination, a member variously positioned in accordance with the degree of braking torque produced by the brake means, brake control means operative during a brake application to effect a reduction in the degree of braking force exerted by the brake means, an electric circuit, an electronic amplifier means having a control element and being operative to vary the current in said circuit at a rate corresponding to the rate of variation of a biasing potential impressed on said control element, means governed in response to sudden movement of said member occurring when said wheel slips due to braking for varying the potential bias on said control element at a corresponding rate, and means operatively responsive to the variation of current in said circuit at the rate resulting from the said sudden movement of said member occurring when said wheel slips for effecting operation of said brake control means.

9. In a vehicle brake control system of the type having brake means for applying a braking force to a vehicle wheel, in combination, a member variously positioned in accordance with the degree of braking torque produced by the brake means, brake control means operative during the brake application to effect a reduction in the degree of brake force exerted by the brake means, electronic amplifier means having a control element subject to a biasing potential, variation of which varies the conductivity of the amplifier means, means responsive to a sudden movement of the said member occurring when the wheel slips due to an excessive braking force for varying the biasing potential on the control element of said amplifier means and thereby the conductivity of said amplifier means at a corresponding rate, and means responsive to the variation in the conductivity of said amplifier means at the rate resulting from said sudden movement of said member occurring when the wheel slips for effecting operation of said brake control means.

10. In a vehicle brake control system of the type having a brake means for applying braking forces to a vehicle wheel, in combination, brake control means operative during a brake application to effect a reduction in the degree thereof, a member having a certain normal position and yieldingly displaced out of its said normal position in varying degree according to the degree of braking torque produced by said brake means, said member being moved rapidly back toward its normal position due to the sudden reduction of the braking torque produced by the brake means when a slipping condition of the wheel occurs, an electrical circuit, means controlled according to the position of said member and operative to establish a current in said circuit varying in accordance with the degree of displacement of said member out of its normal position, and means operative in response to the reduction of the current in said circuit at a rate exceeding a certain rate caused by the last said means upon the occurrence of a slipping condition of the wheel for effecting the operation of said brake control means.

11. In a vehicle brake control system of the type having a brake means for applying braking forces to a vehicle wheel, in combination, brake control means operative during a brake application to effect a reduction in the degree thereof, a member having a certain normal position and yieldingly displaced out of its said normal position in varying degree according to the degree of braking torque produced by said brake means, said member being moved rapidly back toward its normal position due to the sudden reduction of the braking torque produced by the brake means when a slipping condition of the wheel occurs, an electrical circuit including a source of electrical supply and a resistor, means controlled according to the position of said member and operative to establish a current in said circuit and correspondingly a voltage drop across said resistor varying in accordance with the degree of displacement of said member out of its normal position, and means operative in response to the reduction of the voltage drop across said resistor at a rate exceeding a certain rate caused by the last said means upon the occurrence of a slipping condition of the wheel for effecting the operation of said brake control means.

CLAUDE M. HINES.

REFERENCES CITED

The following references are of record in the file of this patent:

UNITED STATES PATENTS

| Number | Name | Date |
|--------|------|------|
| 2,124,410 | Cockrell | July 19, 1938 |
| 2,160,212 | Canetta | May 30, 1939 |
| 2,279,432 | Aikman | Apr. 14, 1942 |
| 2,308,499 | Eksergian | Jan. 19, 1943 |